United States Patent
Stemmer et al.

(10) Patent No.: US 9,764,666 B2
(45) Date of Patent: Sep. 19, 2017

(54) DEVICE FOR ADJUSTING A MOTOR VEHICLE INTERIOR COMPONENT

(71) Applicant: JOHNSON CONTROLS GMBH, Burscheid (DE)

(72) Inventors: Jürgen Stemmer, Remscheid (DE); Dmitrij Gerdt, Köln (DE); Tatjana Samojlova, Leichlingen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 80 days.

(21) Appl. No.: 14/435,273

(22) PCT Filed: Oct. 11, 2013

(86) PCT No.: PCT/EP2013/071283
§ 371 (c)(1),
(2) Date: Apr. 13, 2015

(87) PCT Pub. No.: WO2014/057091
PCT Pub. Date: Apr. 17, 2014

(65) Prior Publication Data
US 2015/0291068 A1   Oct. 15, 2015

(30) Foreign Application Priority Data
Oct. 12, 2012   (DE) .................. 10 2012 020 023

(51) Int. Cl.
*B60N 2/44*   (2006.01)
*B60N 2/10*   (2006.01)
(Continued)

(52) U.S. Cl.
CPC .............. *B60N 2/444* (2013.01); *B60N 2/10* (2013.01); *B60N 2/1685* (2013.01);
(Continued)

(58) Field of Classification Search
None
See application file for complete search history.

(56) References Cited

U.S. PATENT DOCUMENTS 3,958,828 A * 5/1976 Ishida .................. B60N 2/2218
297/361.1
5,896,973 A * 4/1999 Hochmuth ............... B60N 2/02
192/223.2
(Continued)

FOREIGN PATENT DOCUMENTS

CN   201 484 231 U   5/2010
CN   201 961 186 U   9/2011
(Continued)

*Primary Examiner* — Mark Manley
(74) *Attorney, Agent, or Firm* — McGlew and Tuttle, P.C.

(57) ABSTRACT

An adjusting device (1) for a motor vehicle interior component includes a housing (3) in which a rotational element (2) is provided in a rotatable manner about a rotation axis (100). A first locking element (21) is rotationally fixed to the rotational element (2), and a second locking element (22) is provided on the housing (3). The locking elements are reversibly movable relative to each other from a locked situation, in which the locking elements (21, 22) interact with each other in a positively and/or non-positively engaged manner, into an adjustment situation, in which said positive and/or non-positive engagement is released. The adjusting device has an adapter plate (23) which is provided in a rotatable manner relative to the rotational element (2) and the housing (3) and at least temporarily drives a locking element (21, 22).

20 Claims, 13 Drawing Sheets

(51) Int. Cl.
  *B60N 2/66*  (2006.01)
  *B60N 2/22*  (2006.01)
  *B60N 2/18*  (2006.01)
  *B60N 2/16*  (2006.01)
  *F16D 11/00* (2006.01)
  *B60N 2/48*  (2006.01)

(52) U.S. Cl.
  CPC ......... *B60N 2/1892* (2013.01); *B60N 2/2227* (2013.01); *B60N 2/4805* (2013.01); *B60N 2/66* (2013.01); *B60N 2205/20* (2013.01); *F16D 11/00* (2013.01)

(56) References Cited

U.S. PATENT DOCUMENTS

| | | | |
|---|---|---|---|
| 6,212,965 B1 * | 4/2001 | Hochmuth | B60N 2/2257 192/15 |
| 2002/0113479 A1 | 8/2002 | Deptolla | |
| 2003/0025370 A1 * | 2/2003 | Hensel | A47C 7/38 297/285 |

FOREIGN PATENT DOCUMENTS

| | | |
|---|---|---|
| DE | 31 37 331 A1 | 3/1983 |
| DE | 103 38 306 A1 | 3/2005 |
| EP | 0 857 606 A1 | 8/1998 |
| IE | 10 2010 055 179 A1 | 2/2012 |

* cited by examiner

DEVICE FOR ADJUSTING A MOTOR VEHICLE INTERIOR COMPONENT

CROSS REFERENCE TO RELATED APPLICATIONS

This application is a United States National Phase Application of International Application PCT/EP2013/071283 filed Oct. 11, 2013 and claims the benefit of priority under 35 U.S.C. §119 of German Patent Application DE 10 2012 020 023.4 filed Oct. 12, 2012, the entire contents of which are incorporated herein by reference.

FIELD OF THE INVENTION

The present invention relates to an adjusting device, in particular for a motor vehicle interior component, which is used, for example, for adjusting a vehicle seat and/or one of the components thereof.

BACKGROUND OF THE INVENTION

Such adjusting devices are known from the prior art and in each case have a locking device which ensures that the adjusting device is locked on the basis of a frictional engagement between a brake ring and brake elements. The lock is released only when an adjustment movement is initiated by the user. However, in the event of vibrations, there is the risk of the frictional engagement connection being impaired and therefore of an inadvertent adjustment of the motor vehicle interior component occurring.

SUMMARY OF THE INVENTION

It is therefore an object of the present invention to provide an adjusting device, in which the risk of an inadvertent adjustment, in particular due to vibrations, is at least reduced and, at the same time, simple handling and also a modular, and therefore particularly cost-effective production, are made possible without changing the original properties, in particular without increasing the idling travel.

This object is achieved by an adjusting device, in particular for a motor vehicle interior component, comprising a housing in which a rotational element is provided in a rotatable manner about a rotational axis, wherein a first locking element is rotationally fixed to the rotational element, and a second locking element is rotationally fixed on the housing, said locking elements being reversibly removable relative to each other from a locked situation, in which the locking elements interact with each other in a positively and/or non-positively engaged manner, into an adjustment situation, in which said positive and/or non-positive engagement is released, and wherein the adjusting device has an adapter plate which is provided in a rotatable manner relative to the rotational element and the housing and at least temporarily drives a locking element.

The present invention relates to an adjusting device, in particular for a motor vehicle interior component. The latter has a housing in which a rotational element is provided in a rotatable manner about a rotational axis. For example, the housing is provided on a first part and the rotational element is provided on a second part, which is rotatable relative to the first part. Furthermore, the adjusting device has a locking device which consists at least of a first and a second locking element, wherein the first locking element is rotationally fixed on the rotational element and the second locking element is rotationally fixed on the housing. The two locking elements have positive and/or non-positive engagement means which, in the locked situation, interact in a positively and/or non-positively engaged manner and thereby at least very substantially prevent an inadvertent relative movement between the rotational element and the housing. This positive and/or non-positive engagement is reversibly cancelled in the adjustment situation.

According to a preferred embodiment, the first locking element is of two-dimensional design, in particular in the shape of a disk and/or in the shape of a bar. The positive and/or non-positive engagement means is particularly preferably a structure, in particular a toothed structure, in particular one or more teeth. The locking element is very particularly preferably a circular disk with a toothing on the outer circumference, in particular a pinion, said disk being connected in a rotationally fixed manner, for example via a hole in the center thereof, to the rotational element, preferably by means of an integrally bonded engagement, in particular a weld. It is thereby possible in an advantageous manner for a customary standard element to be able to be used, which signifies a high degree of modularization of the adjusting device and therefore directly and/or indirectly cost savings. Furthermore, it is thus advantageously possible to achieve a good positive and/or non-positive engagement with the second locking element.

The second locking element preferably has a substantially two-dimensional extent, in particular with a general longitudinal extent, and, in particular, is formed in the shape of a web. The second locking element is preferably a bent and/or punched sheet metal part. Said locking element is particularly preferably manufactured from spring steel. The second locking element very particularly preferably has an extent, substantially in at least one direction, over the cross section of the entire housing. Even more preferably, the second locking element has, at at least one point, in particular at one end, a fastening means for fixed connection to the housing. The connection between the second locking element and the housing is preferably a snap connection. According to an advantageous embodiment, the fastening means has webs with projections which are fastened to the housing in a manner known to a person skilled in the art. The second locking element preferably extends centrally over the housing of the adjusting device. Such a locking element preferably has, at least in the center thereof, a recess and/or formation, in/on which the rotational element is mounted, and therefore the first locking means and/or the rotational element are mounted rotatably while the second locking element remains in a fixed position.

According to a further advantageous embodiment, the positive and/or non-positive engagement means of the second locking element has a structure, in particular a tooth-shaped structure, which is formed as a corresponding structure to the positive and/or non-positive engagement means of the first locking element. In the locked situation, the tooth-shaped structure of the second locking element preferably engages in the toothed structure of the first locking element while, in the adjustment situation, the tooth-shaped structure is disengaged from the toothed structure.

According to a preferred embodiment, it is provided that at least part of the second locking element, in particular one end of the second locking element, is mounted movably along an axial displacement direction. In particular, in order to transfer the locking device from the locked situation into the adjustment situation, the second locking element is at least partially displaced along the displacement direction so that the teeth of the first locking element are disengaged from the toothed structure of the second locking element.

The second locking element preferably moves with a directional component parallel to the rotational axis of the rotational element. However, a radial displacement direction of the second locking element with respect to the rotational axis of the rotational element is also conceivable.

The second locking element is preferably pretensioned in the direction of the first locking element or in a different direction.

According to a preferred embodiment, it is provided that the second locking element has an unlocking element, wherein the unlocking element is preferably in the form of a material protuberance on the side facing away from an actuating means. However, said unlocking element can also be an indentation. The actuating means is preferably provided on the adapter plate which is provided in a movable manner, in particular rotatable manner, relative to the rotational element and/or the second locking element. The actuating means is particularly preferably formed from the adapter plate. However, the actuating element can also be provided on the second locking element by primary forming or by a cutting method. The actuating means of the adapter plate particularly preferably has a shape corresponding to the material protuberance, wherein, in the locked situation, the actuating means engages in a positively and/or non-positively engaged manner in the unlocking element of the second locking element. Said actuating means can thereby absorb forces and/or torques which act on the second locking element. However, it is also conceivable for the second locking element to have a flat surface with which the actuating means is provided for interaction in such a manner that the second locking means is displaced along the displacement direction.

According to a very particularly preferred embodiment, the adapter plate has a substantially flat extent, in particular an extent substantially in the shape of a disk, wherein the adapter plate has the actuating means, wherein the actuating means of the adapter plate is provided for interaction with the second locking element. During the transfer from the locked situation into the adjustment situation, the second locking element, in particular the unlocking element, is subjected to a force by the actuating means of the adapter plate in order to move, in particular to displace, the second locking element along the displacement direction. In particular, the transfer from the locked situation into the adjustment situation takes place by actuation of the unlocking element and therefore also of the adapter plate.

According to a particularly preferred embodiment, the adjustment device furthermore has a further locking device which is movable between the locked situation and the adjustment situation, wherein the locking device is then provided for a movement between a locking position for locking rotation of the rotational element relative to a brake ring and an unlocking position for releasing a rotation of the rotational element relative to the brake ring.

According to a preferred embodiment, the further locking device is designed in such a manner that, in the locked situation, a positive and/or non-positive engagement, in particular a frictional engagement, is produced between the brake ring and a brake element, while the first locking device is designed in such a manner that, in the locking position, substantially only a positive engagement is produced. A pure positive engagement connection advantageously permits very good securing against an unintentional adjustment of the rotational element due to vibrations.

According to yet another preferred embodiment, the further locking device has at least one brake element arranged between the brake ring and the rotational element, wherein the locking device is then movable between the locking position for locking a rotation of the rotational element relative to the brake ring and the unlocking position for releasing a rotation of the rotational element relative to the brake ring.

The unlocking element is preferably provided for transferring the locking device from the locking position into the unlocking position. In order to adjust the motor vehicle component, the unlocking element therefore merely has to be actuated in order to unlock both the locking device and the further locking device. Despite the double locking, a vehicle occupant's comfort is not impaired.

The adjusting device according to the invention is preferably part of a seat height adjustment mechanism, a seat inclination adjustment mechanism, a backrest inclination adjustment mechanism, a lordosis support adjustment mechanism, a head restraint adjustment mechanism or the like.

However, the adjusting device is suitable for any other adjustment of one part relative to another.

Further details, features and advantages of the invention emerge from the drawings and from the description below of preferred embodiments with reference to the drawings. The drawings here merely illustrate exemplary embodiments of the invention that do not restrict the essential concept of the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

In the various Figures, identical parts are always provided with the same reference numbers and are therefore generally also only named or mentioned once in each case.

Figure 1:
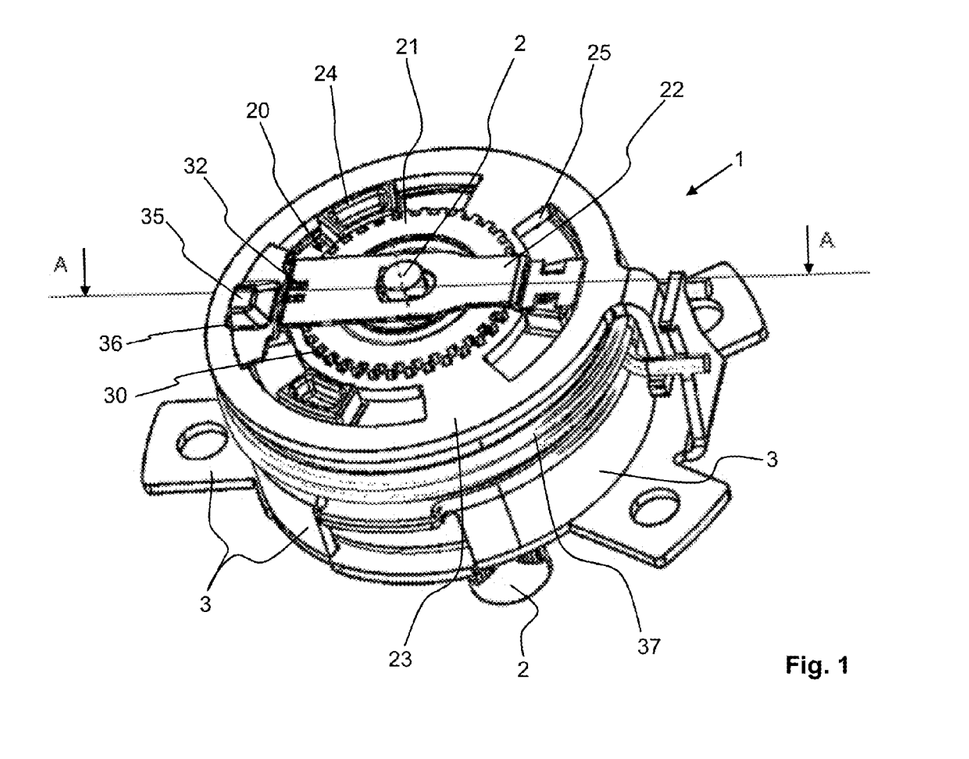
FIG. 1 is a schematic view of an adjusting device according to an exemplary embodiment of the present invention.
Figure 4:
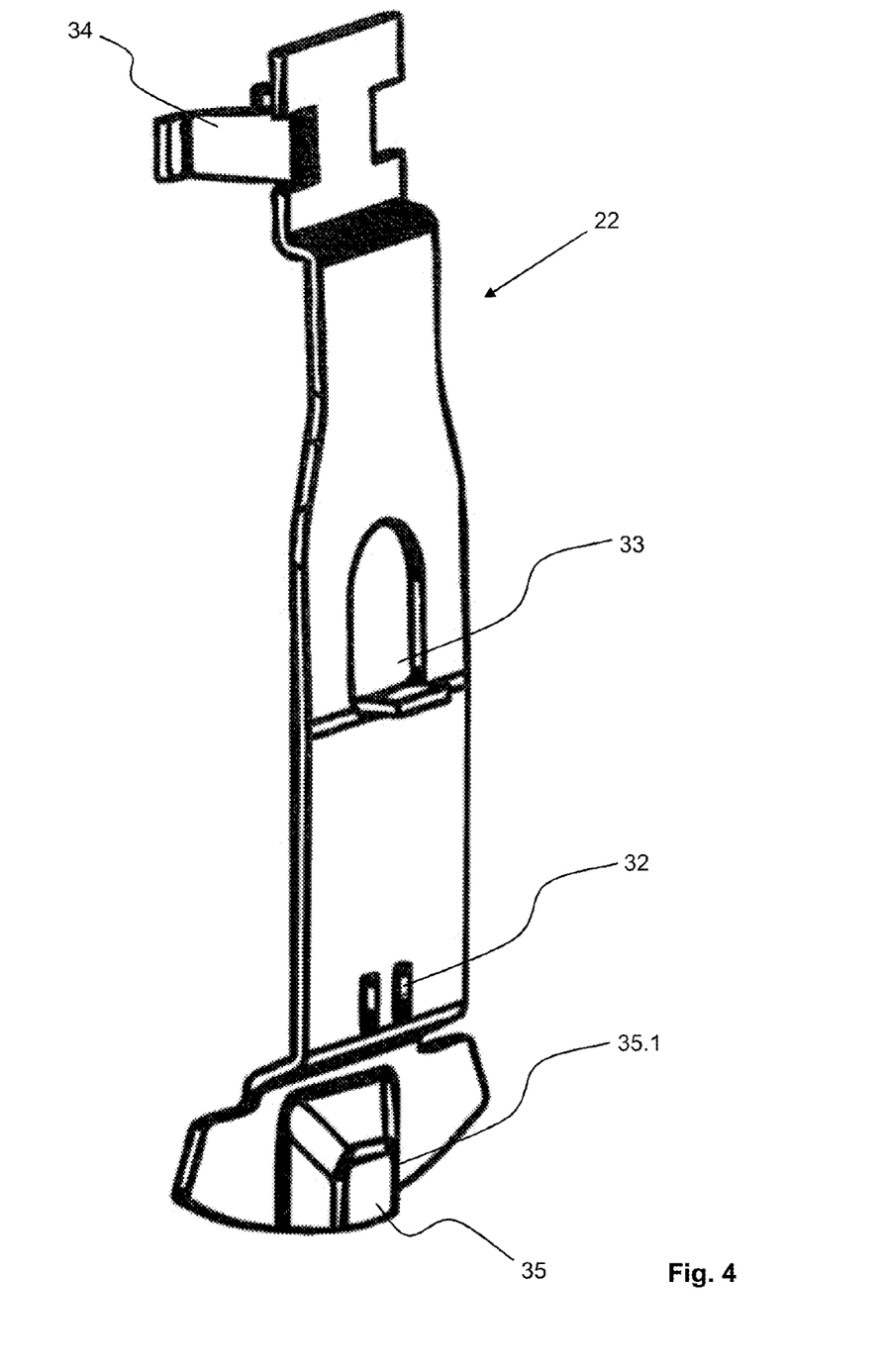
FIG. 4 is a schematic view of the second locking element of the locking device of an adjusting device according to the exemplary embodiment of the present invention.

FIG. 1 illustrates a schematic view of an adjusting device 1 according to an exemplary embodiment of the present invention for a motor vehicle component (not illustrated). The adjusting device 1 has a locking device 20 which is adjustable between a locked situation and an adjustment situation. In the locked situation, rotation of a rotational element 2 about the rotational axis 100 relative to a, preferably vehicle-mounted, housing 3 is prevented by means of the locking device 20. The locking device 20 has a first locking element 21 and a second locking element 22. The first locking element 21 is connected to the rotational element 2 in a rotationally fixed manner. The first locking element 21 has can have positive and/or non-positive engagement elements of which positive engagement elements 30 are used and shown in the preferred embodiment. The first locking element 21 is preferably formed as a gearwheel and, accordingly, has a toothed structure 30 on the circumferential edge thereof. The second locking element 22 is preferably formed as a locking spring and is preferably fixedly connected to the housing 3. The second locking element 22 preferably has a general longitudinal extent along the line A-A and preferably a recess 33 (c.f. FIG. 4) in which the rotational axis of the rotational element 2 is preferably mounted. Said recess 33 is preferably produced by cutting or by deformation. Furthermore, the second locking element 22 can have positive and/or non-positive engagement means of which positive engagement elements for example a tooth-shaped structure 32, which, in the locked situation, is connected in a positively engaged manner to the positive engagement means 30 of the first locking element 21 and thereby prevents movement of the rotational element 2 relative to the housing 3. Furthermore, the second locking element 22 preferably has an unlocking element 35 via which said locking element, in the locked situation, is connected in a positively and/or non-positively engaged manner to an actuating means 36 which is provided in particular on an adapter plate 23. During a transition of the second locking element from the locked situation into the adjustment situation, the second locking element 22 is displaced by the actuating means 36 at least in sections along the displacement direction 101, preferably parallel to the rotational axis 100, in particular by the second locking element being elastically deformed, and the positive engagement between the first and the second locking element being temporarily released. The adapter plate 23 has at least one actuating means 36 and a drive (not illustrated here) with which the adapter plate can be driven, in particular in a rotating manner, for unlocking purposes. The drive can take on any form known to a person skilled in the art and can be connected to the adapter plate 23 via any connection known to a person skilled in the art. The drive is preferably a lever which is preferably connected, in particular welded, to an edge of the adapter plate 23.

Figure 2:
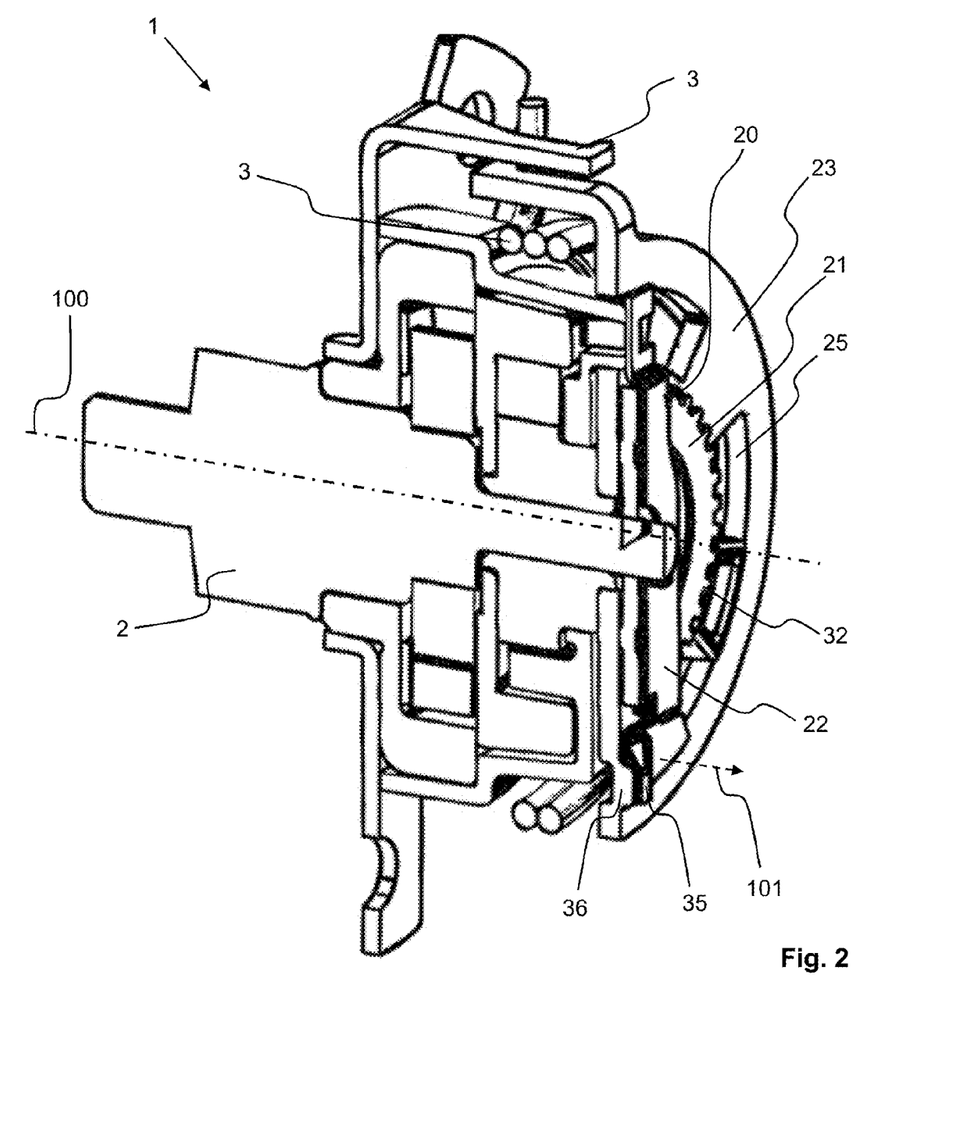
FIG. 2 is a schematic sectional drawing of the adjusting device according to FIG. 1.

FIG. 2 illustrates a schematic sectional drawing of an adjusting device 1 according to FIG. 1 along the intersecting line A-A. The rotational element 2 is mounted in a rotatable manner about the rotational axis 100. The adapter plate 23 is provided so as to be movable, in particular rotatable, both relative to the housing 3 and to the rotational element 2. The adapter plate is designed in such a manner that, by rotation of the adapter plate 23, the unlocking element 35 is subjected to a force by the actuating means 36 and therefore the second locking element 22 is displaced in the displacement direction 101 and the locking is released. For this purpose, both the actuating means and the locking means preferably in each case have at least one ramp-like surface, as a result of which, when the adapter plate 23 moves in a plane, the second locking element 22 moves along the displacement direction 101 at an angle, in particular at a right angle, to said plane. The adapter plate 23 preferably has restricting means receiving means 25, and therefore the possible adjustment path of the adapter plate 23 is restricted by corresponding restricting means 24 of the housing 3 such that the actuating means 36 does not pass out of contact with the second locking means 22. By this means, an undesired locking of the adjusting device 1 is advantageously prevented. The housing means very particularly preferably has spring means 37 which are provided for returning the adapter plate 23 into the original position thereof. During the movement, in particular rotation, of the adapter plate 23 into the original position thereof, the second locking element 22 springs back into the locking position thereof in the opposite direction to the displacement direction 101.

Figure 3:
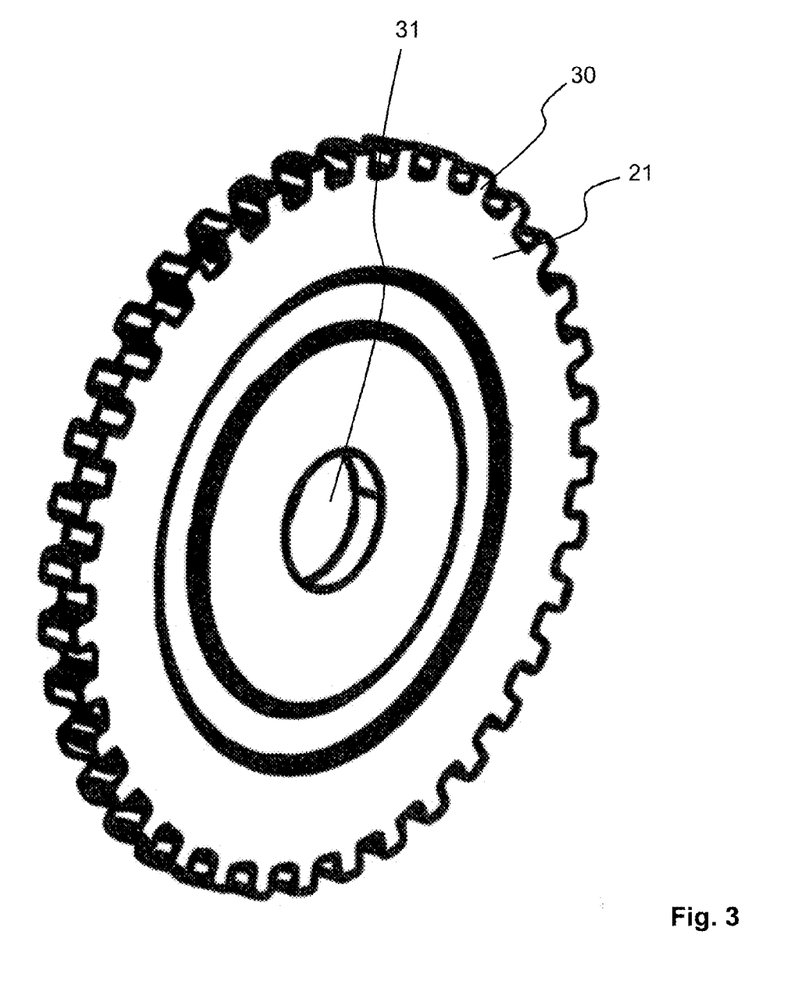
FIG. 3 is a schematic view of the first locking element of the locking device of the adjusting device according to FIG. 1.

FIG. 3 is a schematic view of the first locking element 21 of the locking device 20 of the adjusting device 1. The first locking element 21 is connected in a rotationally fixed manner to the rotational element 2, here via a recess 31, and, in the locked situation, enters into a positively engaged connection with the second locking element 22, here via the toothed structure 30.

FIG. 4 illustrates a schematic view of the second locking element 22 of the locking device 20 of the adjustment device 1. The second locking element 22 is preferably produced as a bent sheet metal part, in particular from spring steel. Said locking element is preferably designed as a web-shaped locking spring and has a recess 33 and a fastening means 34. The second locking element 22 is connected in a positionally fixed manner to the housing 3 via the fastening means 34 and/or optionally the recess 33, wherein preferably only one end, in particular the end which is opposite the unlocking element 35 and/or the positive engagement means 32, is connected to the housing, and therefore the other end, at which the unlocking element 35 and/or the positive engagement means 32 are provided, can move along the displacement direction 101. The second locking element 22 preferably has an unlocking element 35 which is preferably designed as a material protuberance on the side facing away from the adjusting device 1. Said formation preferably has oblique surfaces 35.1 which interact with corresponding, in particular oblique, surfaces on the actuating means in order to produce a movement of the second locking means in the displacement direction 101. The unlocking element 35 is particularly preferably designed as a truncated pyramid. In the locked situation, the second locking element 22 is connected in a positively and/or non-positively engaged manner to the actuating means 36 of the adapter plate by means of the unlocking element 35. During the transition from the locked situation into the adjustment situation, which is brought about by rotation of the adapter plate 23 about the rotational axis 100, the unlocking element 35 is subjected to a force by the actuating means 36 and is thereby moved along the displacement direction 101. In the process, the second locking element 22 is preferably deformed elastically. Furthermore, the second locking element 22 has positive engagement means 32, here a tooth-shaped structure 32, via which said locking element is connected, in the locked situation, in a positively engaged manner to the positive engagement means 30, here the toothed structure 30, of the first locking element 21. The positive engagement means is preferably incorporated into the locking element 22 by punching and/or deformation.

Figure 5:
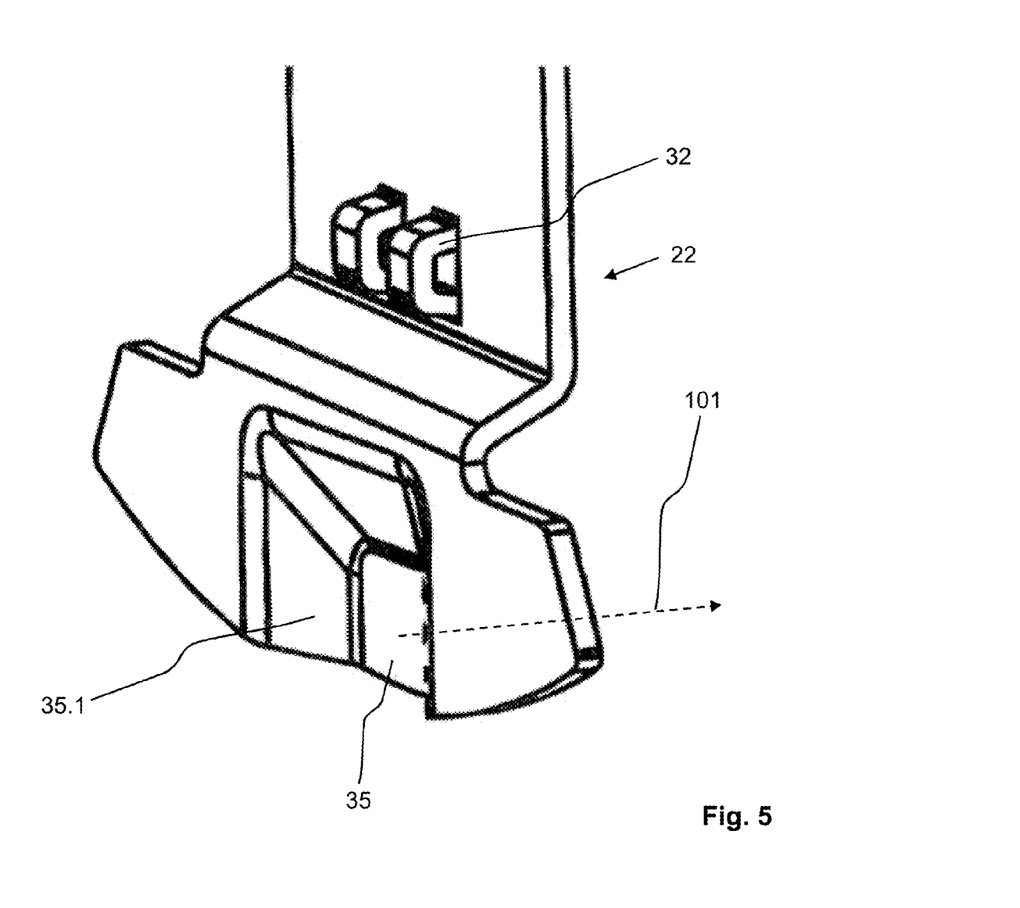
FIG. 5 is a schematic detailed view of the second locking element of the locking device of an adjusting device according to FIG. 1.

FIG. 5 illustrates a schematic detailed view of the second locking element 22 of the locking device 20 of the adjusting device 1. In particular, that side of the second locking element 22 which faces the adapter plate 23 and/or the housing 3 is illustrated here. The depression of the unlocking element 35, which depression is brought about by the material protuberance and, in the locked situation, is connected in a positively and/or non-positively engaged manner to the actuating means 36, can clearly be seen, as can the tooth-shaped structure 32 of the locking element 22.

Figure 6:
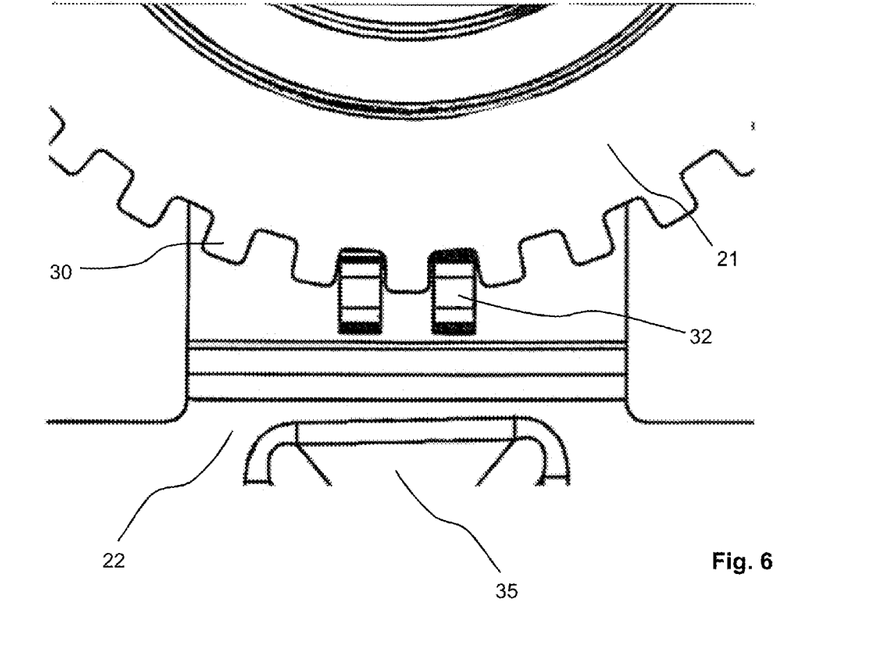
FIG. 6 is a schematic detailed view of the first locking element and of the second locking element of the locking device in the locked situation of an adjusting device according to FIG. 1.

FIG. 6 illustrates a schematic detailed view of the first locking element 21 and of the second locking element 22 of the locking device 20 in the locked situation of the adjusting device 1. The tooth-shaped structure 32 of the second locking element 22 is connected in a positively engaged manner to the toothed structure 30 of the first locking element 21.

Figure 7:
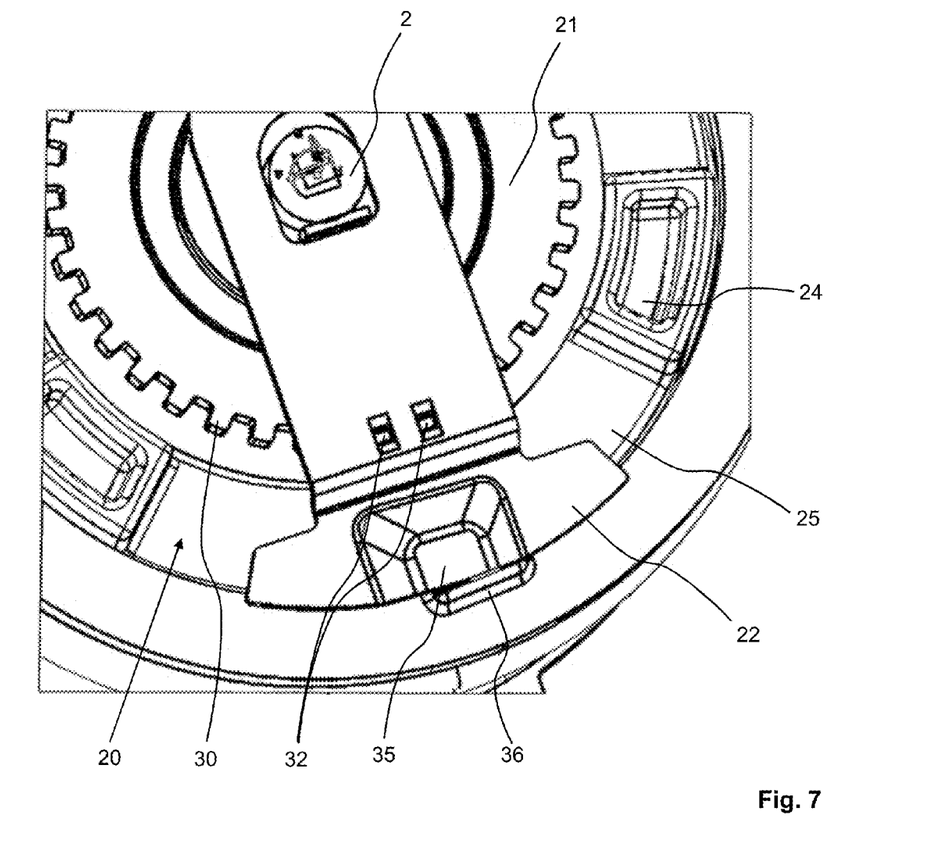
FIG. 7 is a schematic detailed view of the locking device in the locked situation of an adjusting device according to FIG. 1.

FIG. 7 illustrates the transition of the locking device from the locked situation into the adjustment situation. The actuating means 36 has already been displaced in relation to the unlocking element 35, but not yet to an extent such that the tooth-shaped structure 32 is released from the toothed structure 30 and the adjusting device is unlocked.

Figure 8:
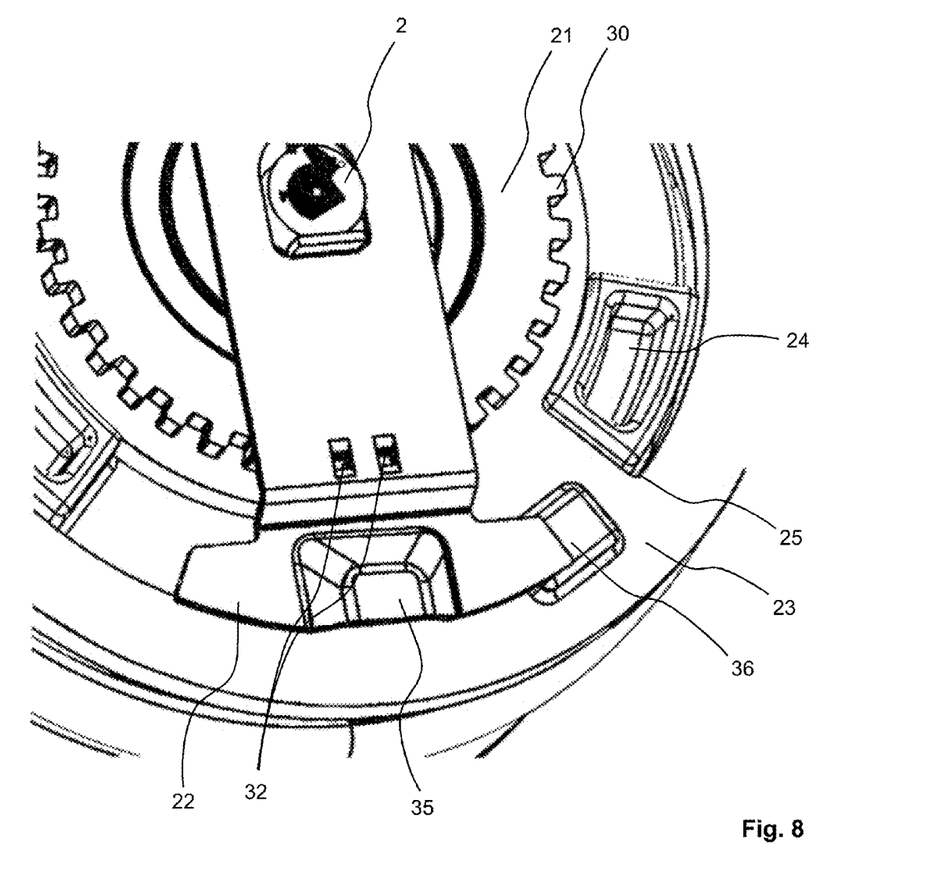
FIG. 8 is a schematic detailed view of the locking device in the adjustment situation of an adjusting device according to FIG. 1.

FIG. 8 illustrates the locking device 20 in the adjustment situation. The adapter plate 23 and therefore the actuating means 36 are displaced relative to the second locking element 22 and in particular the unlocking element 35 in such a manner that the second locking element 22 has been moved in the direction of the displacement direction 101 to an extent sufficient such that the positively engaged connection between the tooth-shaped structure 32 and the toothed structure 30 has been released. It can clearly be seen that the housing-mounted restricting means 24 in cooperation with the recess 25 in the adapter plate 23 prevents further rotation of the adapter plate, here counterclockwise, which further rotation would have the consequence of bringing about undesired locking between the first and the second locking means.

Figure 9:
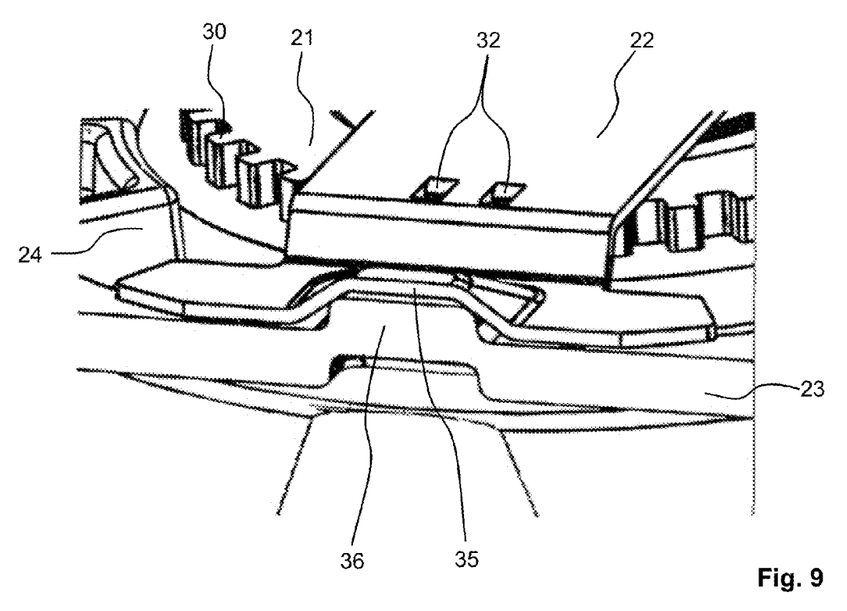
FIG. 9 is a schematic sectional drawing of the locking device in the locked situation of an adjusting device according to FIG. 1.

FIG. 9 shows a schematic sectional drawing of the locking device 20 in the locked situation of the adjusting device 1. The second locking element 22 bears against the adapter plate 23 and is preferably pretensioned in the direction of the adapter plate 23. The unlocking element 35 receives the actuating means 36. The toothed structure 30 and the tooth-shaped structure 32 are connected in a positively engaged manner.

Figure 10:
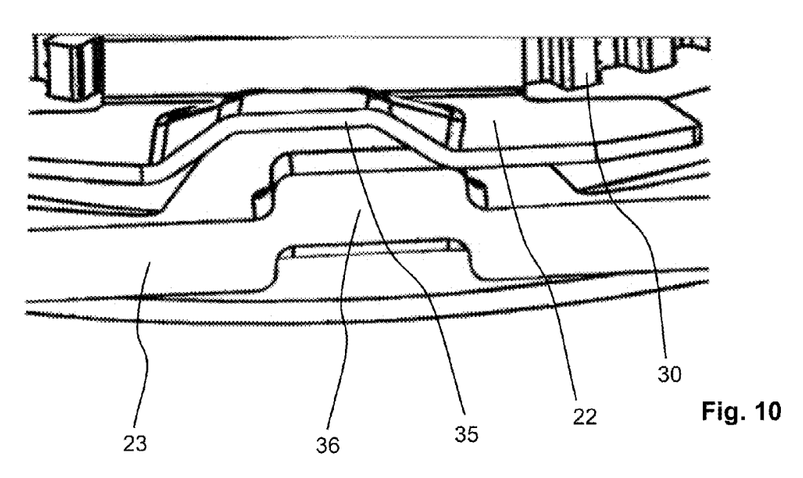
FIG. 10 is a schematic sectional drawing of the locking device during the transition from the locked situation into the adjustment situation of an adjusting device according to FIG. 1.

FIG. 10 illustrates a schematic sectional drawing of the locking device 20 during the transition from the locked situation in the adjustment situation of the adjusting device 1. The second locking element 22 has already been displaced in the displacement direction 101 to such an extent that the adjusting device 1 is unlocked, but the adapter plate has still not covered the maximally possible adjustment path. For example, a rotation of the adapter plate 23 by 4° corresponds to an adjustment path of the second locking element 22 of 1 mm. This corresponds in the example to complete unlocking. Owing to the fact that the locking elements 21, 22 have been unlocked, but the adapter plate still has an adjustment path available, comparatively large manufacturing tolerances can be permitted.

Figure 11:
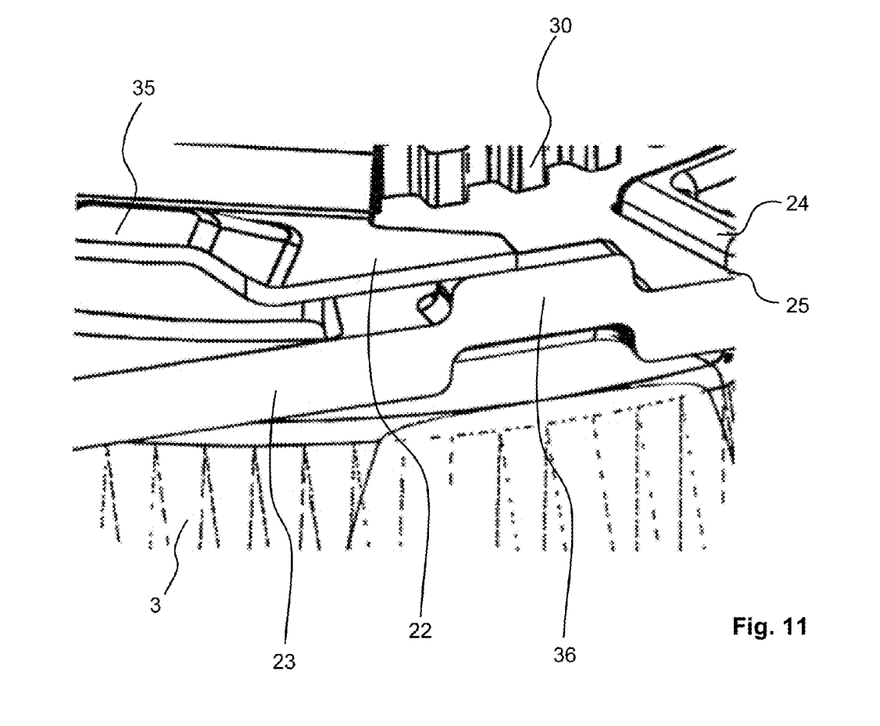
FIG. 11 is a schematic sectional drawing of the locking device in the adjustment situation of an adjusting device according to FIG. 1.

FIG. 11 illustrates a schematic sectional drawing of the locking device 20 in the adjustment situation of the adjusting device. The adjusting device 1 is completely unlocked and the restricting means 24 have moved against the restricting means receiving means 25. For example, the adapter plate 23 has rotated through 30° here.

Figure 12:
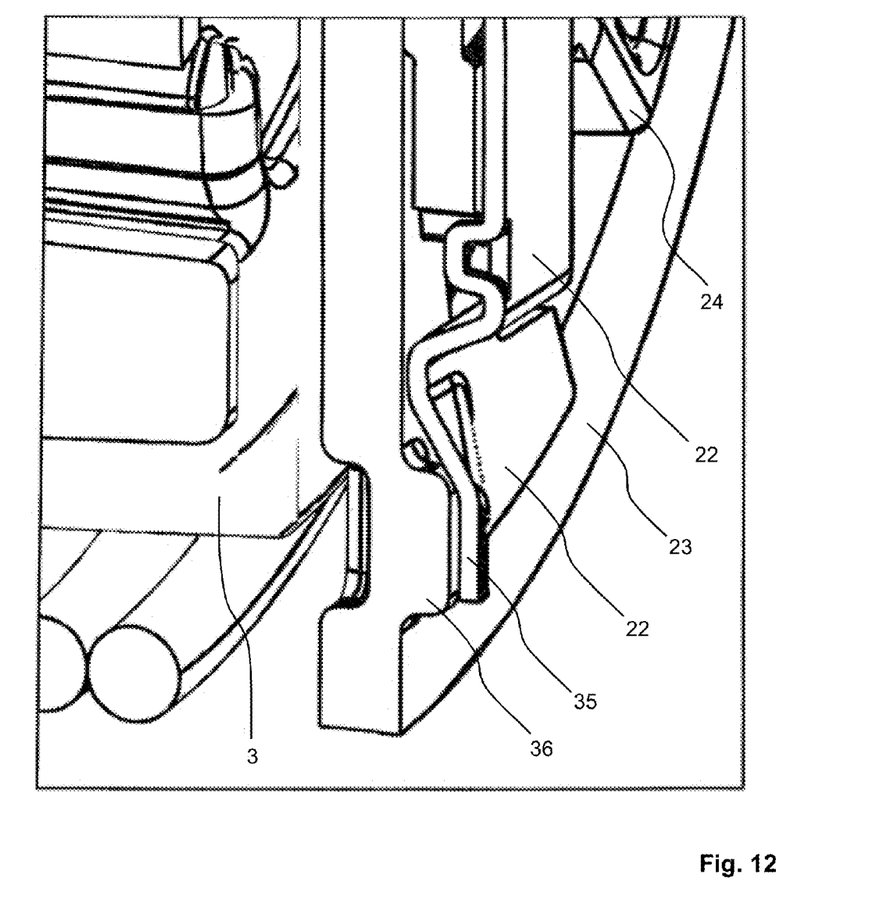
FIG. 12 is a schematic sectional drawing of the locking device in the locked situation of an adjusting device according to FIG. 1.

FIG. 12 illustrates the same situation as in FIG. 9.

Figure 13:
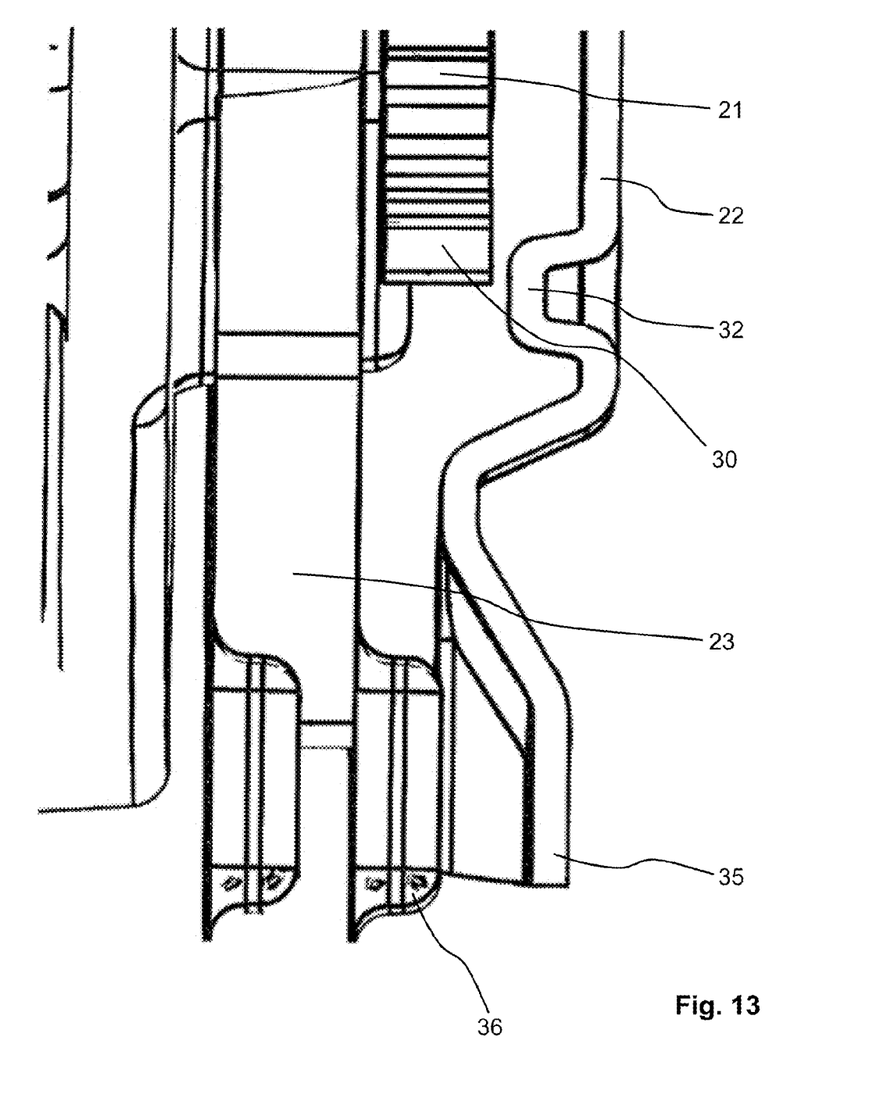
FIG. 13 is a schematic sectional drawing of the locking device in the adjustment situation of an adjusting device according to FIG. 1.

FIG. 13 illustrates the same situation as in FIG. 11.

Figure 14:
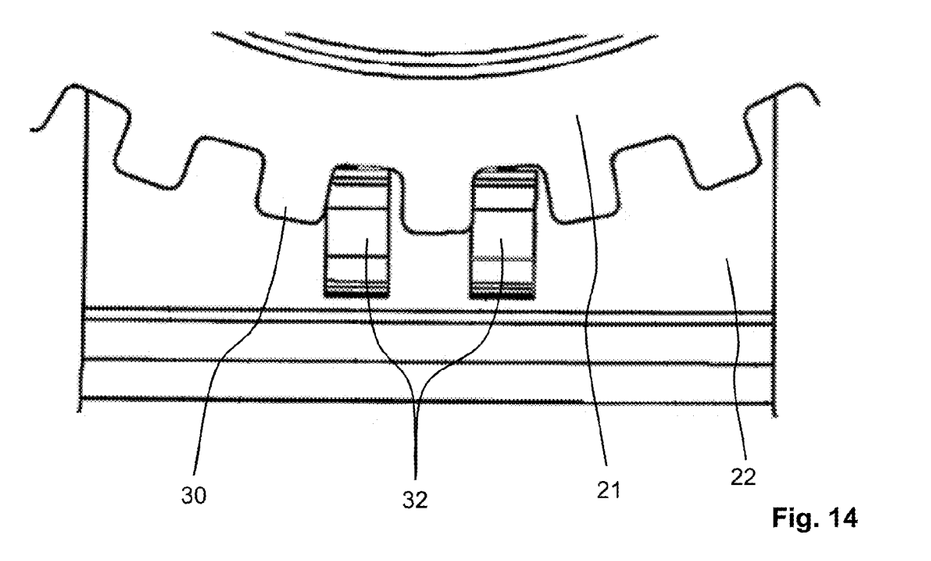
FIG. 14 is a schematic detailed view of the first locking element and of the second locking element of the locking device in the locked situation with the greatest possible adjustment path of an adjusting device according to FIG. 1.

FIG. 14 illustrates the same situation as in FIG. 6, wherein the tooth-shaped structure 32 here is arranged and/or formed relative to the toothed structure 30 in such a manner that a certain amount of play is provided between the locking elements 21, 22, but said play is, for example, at maximum 9.5°. The rotational element 2 can also move by the same angle relative to the housing in the locking situation.

In the unlocking position or adjustment situation, the rotational element 2 is preferably driven by a drive means which is rotatable about the rotational axis 100. The rotational element 2 serves to actuate a motor vehicle interior component, for example a seat height adjustment mechanism, a seat inclination adjustment mechanism, a backrest inclination adjustment mechanism, a lordosis support adjustment mechanism or a head restraint adjustment mechanism.

While specific embodiments of the invention have been shown and described in detail to illustrate the application of the principles of the invention, it will be understood that the invention may be embodied otherwise without departing from such principles.

The invention claimed is:

1. An adjusting device for a motor vehicle interior component, the adjusting device comprising:
    a housing in which a rotational element is provided in a rotatable manner about a rotation axis;
    a first locking element rotationally fixed to the rotational element;
    a second locking element is provided on the housing, said locking elements being reversibly movable relative to each other from a locked situation, in which the locking elements interact with each other in a positively engaged manner, into an adjustment situation, in which said positive engagement is released, second locking element being displaced between said locked situation and said adjustment situation by said second locking element being elastically deformed between one end fixed to said housing and other end engaging with said first locking element;
    an adapter plate which is provided in a rotatable manner relative to the rotational element and the housing and at least temporarily drives a locking element;
    an actuating means provided on the adapter plate;
    an unlocking element on the second locking element, said unlocking element interacting with the actuating means.

2. The adjusting device as claimed in claim 1, wherein the second locking element is provided as a web shaped sheet metal part formed from spring steel.

3. The adjusting device as claimed in claim 2, further comprising a spring element pretensioned in a direction of the adapter plate, said spring element being incorporated into said web shaped sheet metal part.

4. The adjusting device as claimed in claim 1, wherein the second locking element has a fastening means for fastening said locking element to the housing.

5. The adjusting device as claimed in claim 4, wherein the fastening means is a snap fastener.

6. The adjusting device as claimed in claim 4, wherein a positive engagement means is provided on the second locking element at a distance from the fastening means and interacts in a positively engaged manner with the first locking element in the locked situation.

7. The adjusting device as claimed in claim 6, wherein the positive engagement means is incorporated into the material of the second locking element by deformation, primary forming or cutting.

8. The adjusting device as claimed in claim 4, wherein:
the unlocking element is provided on the second locking element at a distance from the fastening means.

9. The adjusting device as claimed in claim 8, wherein the unlocking element is provided as at least one of a protuberance and an indentation in the material of the second locking element.

10. The adjusting device as claimed in claim 9, wherein the second locking means moves at least in sections along a displacement direction from the locked situation into the adjustment situation.

11. The adjusting device as claimed in claim 10, wherein the protuberance has an oblique surface relative to the displacement direction.

12. The adjusting device as claimed in claim 1, wherein said adjusting device is part of a vehicle seat.

13. The adjusting device as claimed in claim 5, wherein a positive engagement means is provided on the second locking element at a distance from the fastening means and interacts in a positively engaged manner with the first locking element in the locked situation.

14. An adjusting device for a motor vehicle interior component, the adjusting device comprising:
a housing;
a rotational element arranged in said housing and rotatable with respect to said housing about a rotation axis;
a first locking element rotationally fixed to said rotational element;
a second locking element having a first end fixed on said housing, said second locking element have a diametrically opposite second end being movable relative to said first locking element along an axial direction of said rotation axis between a locked position rotationally fixing said locking elements to each other, and to an adjustment position in which said locking elements are movable relative to each other about said rotation axis, second locking element being displaced between said locked position and said adjustment position by said second locking element being elastically deformed between said first and second ends;
an adapter plate rotatably mounted on said housing and said rotational element, said adapter plate being adapted to move one of said locking elements when rotated.

15. The adjusting device as claimed in claim 14, wherein:
said adapter plate moves said second end of said second locking element along said axial direction relative to said housing when said adapter plate is rotated relative to said housing.

16. The adjusting device as claimed in claim 14, further comprising:
a spring incorporated into said second locking element between said first and second end and biasing said second end of said second locking element into said locked position.

17. The adjusting device as claimed in claim 14, further comprising:
a fastener as part of said first end of said second locking element and fastening said second locking element to said housing;
an actuator mounted on said adapter plate;
an unlocking element mounted on said second locking element at a position spaced from said fastener.

18. The adjusting device as claimed in claim 17, wherein:
said unlocking element is adapted to interact with said actuator, said unlocking element being one of a protuberance and an indentation in material of said second locking element.

19. The adjusting device as claimed in claim 14, wherein:
said second locking element extends diametrically across said rotational element.

20. The adjusting device as claimed in claim 14, wherein:
said second end of said second locking element bends with respect to said first end of said second locking element to move said second end between said locked position and said adjustment position.

* * * * *